Nov. 15, 1960  M. BAERMANN  2,959,832
FLEXIBLE OR RESILIENT PERMANENT MAGNETS
Filed Oct. 31, 1957

*INVENTOR.*
MAX BAERMANN
BY
ATTORNEY 2,959,832
Patented Nov. 15, 1960

2,959,832

FLEXIBLE OR RESILIENT PERMANENT MAGNETS

Max Baermann, Bensberg Wolfshof, Koln (Rhine), Germany

Filed Oct. 31, 1957, Ser. No. 693,603

15 Claims. (Cl. 24—201)

This invention pertains to the art of permanent magnets and more particularly to a flexible permanent magnetic material which may be employed for a number of different purposes.

The present invention is particularly adapted as a locking, sealing or adhesive element for doors, windows, covers or the like or for the holding or closing of garments and draperies and will be described with particular reference thereto, although it will be appreciated that the invention has broader applications, for example, wherever it is necessary to provide a holding action between a flexible member and a ferro magnetic surface.

For these purposes, many different kinds of means are known, for example, bolts or latches for doors and the like as well as hooks, eyes, snap fasteners and zippers for garments. With zippers, the disadvantage is present that a separate closing member must always be operated for opening and closing the zipper which often presents difficulties. With the other means, usually they hold the parts at only one determined point along the length because the locking elements have a limited width and length. Also in all of these known means, they are affected with a more or less great amount of wear depending upon the exact type.

The present invention provides a new and improved closure means which overcomes all of the above-referred to difficulties and provides a closure means which is simple in construction and operation, is not subject to wear and providse an even and uniform locking, sealing, adhesive or closing action over as long or wide an area as is desired.

In accordance with the present invention, a flexible material such as rubber, synthetic rubber, flexible plastic or similar soft elastic material has incorporated throughout its entire mass a powdered permanent magnetic material so that the flexible material may be magnetized after first processing or forming into strips, frames, hollow profiles or laminated forms of any desired length or cross section and with any desired magnetic polarity. Such flexible magnetic material will adhere to ferro magnetic surfaces and can be employed for a great variety of purposes depending upon the form taken since the locking, sealing or closing action extends over the whole surface of the material and is equally strong at all points. Thus a door can be covered throughout its entire periphery so that it will be held in sealing relationship with the entire periphery of the frame.

The flexible magnetized material may be manufactured in a number of different ways. In accordance with one embodiment of the invention, the desired flexible base material is mixed with powdered magnetic material and extruded from the nozzle of an extrusion press in any desired cross sectional form or dimension including small or large dimensions.

Further in accordance with the invention, the flexible or elastic magnetic material may be fastened to either a rigid or flexible or elastic non-magnetic mass serving as a body to provide a desired cross sectional shape remote from the magnetic surface.

The elastic magnetic material and the non-magnetic material may be fastened as desired such as by cementing or gluing when the non-magnetic material is rigid or when the non-magnetic materials is elastic by simultaneously extruding both materials through an extrusion die so that as the two portions, magnetic and non-magnetic, emerge a further cementing or welding is unnecessary.

It also will be appreciated that when the elastic materials are extruded, a flexible fibrous material such as lint or cloth can be arvantageously employed as a reinforcing means to hold the magnetic and non-magnetic members in a firm bonded relationship.

Further in accordance with the invention, the flexible or elastic magnetic member can be advantageously provided with projections or recesses such as slots or grooves for the making of a mechanical connection with the non-magnetic elastic body or they can be fastened together by means of pins, screws or cementing.

When the invention is employed to make a closure for garments or for draperies, a flexible or elastic magnetic member is fastened to each of the parts to be connected so that they will adhere magnetically to each other when brought together.

In making closures similar to zippers, in accordance with the invention, the closing elements fastened to the edge of the garment are provided with corrugations and projections of angular T-shaped or undercut cross section in the lengthwise axis of the members so that when a pull occurs perpendicularly to the magnetic attraction, a mechanical locking results to prevent release of the magnetic attraction.

It will be appreciated that the flexible magnetic material can be made in a large flat surface as for example in a plate or sheet by known techniques of casting, rolling, extruding or blowing. Such a plate or sheet may be fastened to a fixed base of any desired material and ferro-magnetic parts of any desired shape will thus adhere thereto. Such ferro-magnetic parts may be figures, small scale models or the like.

Further in accordance with the invention, electrical conducting wire is provided with an outer layer or portion of flexible or elastic magnetic material which may conveniently be extruded with the wire and its insulation. Such a wire with a permanent magnetic mass affixed or incorporated therewith, has the ability of being attracted to ferro-magnetic surfaces as for example may be found in bridges and ships and the electric wire or cable may be laid without the need for auxiliary fastening means to hold it in place.

The principal obejct of the invention is the provision of a new and improved elastic material having incorporated therein a powdered permanent magnetic material so that the elastic material may itself be a permanent magnetic material.

Another object of the invention is the provision of a new and improved permanent magnetic elastic material which may be conveniently fastened to other mechanical elements so as to provide a locking, sealing or adhesive action to adjacent mechanical elements.

Another object of the invention is the provision of a new and improved magnetic elastic material which may be employed as a closure for garments, draperies or the like.

Another object of the invention is the provision of a new and improved elastic permanent magnetic material which will provide an even and uniform locking or sealing action over as long or as wide a surface area as is desired.

Another object of the invention is the provision of a new and improved electrical cable which may be held in place adjacent ferro-magnetic surfaces without the need for conventional fastening brackets or clamps.

Another object of the invention is the provision of a new and improved closure means for garments or hanging draperies which does not require a movable member for opening or closing the closure which provides a uniform closing force over the entire length of the garments or draperies.

Another object of the invention is the provision of a new and improved method of manufacturing elastic permanent magnetic material which is simple and inexpensive.

Another object of the invention is the provision of a new and improved elastic magnetic material in combination with elastic non-magnetic materials.

The invention may take physical form in certain parts and arrangement of parts, a preferred embodiment of which will be described in detail in this specification and illustrated in the accompanying drawing which is a part hereof and wherein.

Figure 1:
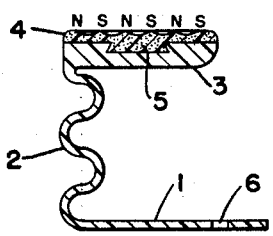
Figure 1 is a cross-sectional view of an elastic seal which may be conveniently employed for maintaining the doors of cabinets or the like tightly closed and showing by the use of the letters N and S the magnetic polarity.
Figure 3:
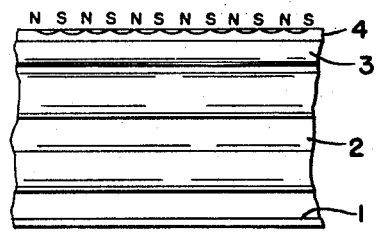
Figure 3 is a side elevational view of Figure 1.
Figure 2:
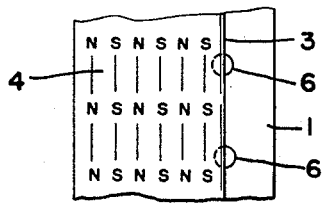
Figure 2 is a top elevational view of Figure 1.
Figure 4:
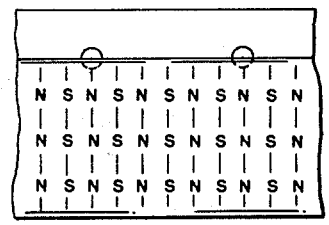
Figure 4 is a view similar to Figure 2 oriented 90° on the page and showing an alternative arrangement of the magnetic polarization.

Referring now to the drawings wherein the showings are for the purposes of illustrating preferred embodiments of the invention only and not for the purposes of limiting same, Figures 1–4 show an elastic seal such as might be used on cabinets which must be kept tightly closed. In Figure 1, the seal has a U-shaped profile including a pair of parallel extending legs 1, 3 and an intermediate base generally corrugated in shape, the entire member being formed preferably from an elastic material such as polyethylene or its equivalent.

The leg 1 is adapted to be fastened to the edge of a door or the like by means of screws, pins or like fastenings extending through the openings 6. The opposite leg 3 is somewhat thicker and has on its outer surface a layer of elastic permanent magnetic material 4. The magnetic material 4 and the leg 3 may be joined in any desired manner, but in the preferred embodiment a bevel tongue and groove joint as at 5 is employed. The plate or material 4 is magnetized throughout its entire length and across its entire width so as to have a plurality of opposite magnetic poles on the surface thereof as indicated. In the embodiment shown in Figures 1 and 2, the magnetic poles of one polarity extend longitudinally along the length of the plate 4 and alternate transversely across the length. In the embodiment shown in Figure 4, the polarity is the same across the width of the plate 4 and alternates along its length. In either event, it will be appreciated that when the plate 4 comes into the vicinity of a ferro-magnetic member, it will be attracted thereto and drawn into a firm sealing relationship, which sealing relationship will exist over its entire length and across its entire width.

The corrugated portion 2 provides a springiness or elasticity allowing the plate 4 to conform to any irregularities or variations in the spacing of the edges of the door relative to its frame.

The magnetic material forming the plate 4 in accordance with the preferred embodiment of the invention is comprised of a mass of polyvinylchloride either made soft or mixed with softeners and further mixed in a powdered state with a ground permanent magnetic material having a grain size less than 0.3 mm. Preferably the polyvinylchloride and the permanent magnetic material are combined in the ratio of 40–60 by volume. These materials are then plasticized in a suitable press. The plasticized mass is then extruded through a nozzle shaped as is desired.

The grains of ground permanent magnetic material are dispersed in spaced relationship throughout the mass of polyvinyl-chloride with the spaces between the individual grains filled by the polyvinylchloride which as is known, is non-magnetic, that is to say, it has unity magnetic permeability.

The strip is then allowed to cool. After cooling, it is brought into the proximity of a magnetizing device having a plurality of poles with a pole distance of 1 millimeter and a pole width of 3 millimeters and alternately magnetized with north and south poles, all of such poles being arranged to lie in rows either side by side or behind each other depending upon polarization desired for the plate 4. The magnetic poles are then energized by any suitable means, but preferably from a condenser which is able to deliver a short impulse of high current, for example, 1,000 amperes. Suitable switching means, such as for example, a thyratron, may be employed for connecting the condenser to the magnetic poles.

Plates 4 magnetized as above pointed out with alternating north and south poles and having a thickness of about 1.5 millimeters, have an adhesive force of about 20 grams per square centimeter on a varnished iron plate. If two plates 4 are placed directly on each other, the adhesive force is correspondingly greater. Such a thin plate is extremely difficult, if not impossible, to obtain where the plate is to be made of 100% permanent magnetic material.

Especially suitable as permanent magnetic materials are iron-barium-oxide, bismuth-manganese or other similar magnetic materials which have the highest possible coercive force and low permeability.

Thus as is shown in United States Letters Patent No. 2,762,777 to Went et al., issued September 11, 1956, barium ferrite (iron-barium-oxide) is known to have a coercive force of 1900 oersteds and higher. In the same patent, strontium ferrite is shown to have an even higher coercivity, while lead ferrite is shown to have a coercivity as high as 1830 oersteds, which is just slightly below the lower value for barium ferrite.

Also as is described in United States Letters Patent No. 2,576,679 to Guillaud, issued November 27, 1951, and the article in "Journal of Applied Physics," November 1952, by Adams et al., powdered bismuth manganese (or manganese bismuthide) is known to have an extremely high coercive force, including values in excess of 4,000 oersteds.

These same materials also have a very low magnetic permeability, barium ferrite having, as is described in the publication, "The Phillips Technical Review," volume 13, No. 7, pages 194–208, Unity Magnetic Permeability, that is the same as air or other non-magnetic materials.

It will thus be seen that the closure shown in Figure 1 exerts a very substantial holding force against an opposite ferro-magnetic surface which holding force is distributed uniformly over the entire length of the closure and yet which may be broken readily, for example, by raising one corner of the sealing means and then opening the door by allowing the point of opening to progress along the edge of the strip.

Figure 5:
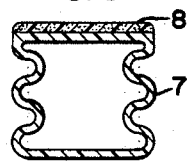
Figure 5 is a cross-sectional view somewhat similar to Figure 1 but showing an alternative embodiment of the invention.

Figure 5 shows an arrangement somewhat similar to Figure 1, but here the backing or base is in the form of a tube 7 having on one side thereof a plate 8 of an elastic material similar to the elastic material of the plate 4 of Figure 1. The embodiment shown in Figure 5 is of particular value for use for sealing refrigerator doors.

Figure 6:
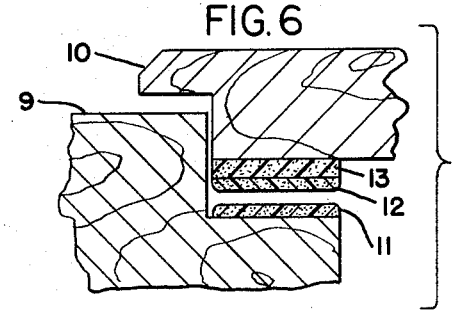
Figure 6 is a fragmentary cross-sectional view of an edge of a door and the edge of a door frame showing the invention applied thereto.

Figure 6 shows a still further embodiment of the invention in which the opposite surfaces 9 of a door frame 10 of a door are covered throughout their entire length with a permanent magnetic material 11, 12. A foam rubber plate 13 is placed behind the member 12 for the purpose of cushioning the members as they close and also for the purpose of equalizing any unevenness in the spacing of the door 10 as it closes.

Figure 7:
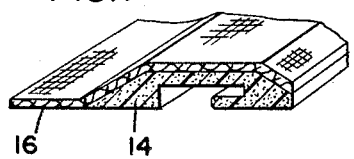
Figure 7 is a cross-sectional perspective view of the elastic magnetic material in a form to provide a garment closure similar to a zipper.
Figure 8:
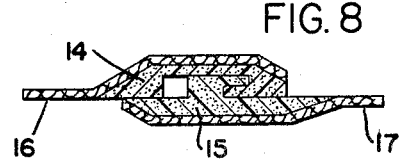
Figure 8 is a cross-sectional view showing the closure in a closed position.
Figure 9:
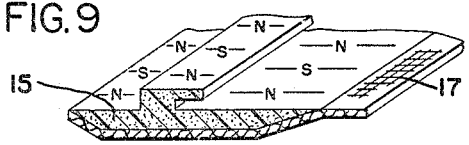
Figure 9 is a view somewhat similar to Figure 7 showing the corresponding member for mating with a member of Figure 7 and with the magnetic polarization shown.

Figures 7, 8 and 9 show the use of the invention on a garment closure somewhat similar to a zipper. Figure 7 shows a fabric or like member 16 adapted to be fastened by suitable means to one edge of the garment and fastened as by gluing or cementing to an elastic mass 14 of elastic rubber or plastic filled with permanent magnetic material as above described. The mass 14 has a longitudinally extending groove with an undercut portion towards its outer edge that is remote from the garment.

In a like manner, Figure 9 shows the mating part of the closure and includes a fabric or like portion 17 adapted to be attached to the edge of the garment. A plastic mass 15 similar to that of the plastic mass 14 is fastened to the fabric 17 and has an upstanding longitudinally extending portion with a tongue extending away from its outer edge. It will be noted from Figure 8 which shows the members 14, 15 closed, that the upstanding portion of the member 15 has a width less than the width of the groove in the member 14, and that the tongue is generally of the same length as the undercut portion from the groove in the member 14.

The total width of the upstanding portion and the tongue relative to the width of the groove may be proportioned for easy assembly and disassembly. Thus the two masses 14, 15 may be slid or moved in a direction transversely to their longitudinal length to bring the tongue into engagement with the undercut portion. A mechanical locking results. The members 14, 15 are each magnetized with transversely extending poles which alternate in a longitudinal direction. With this arrangement, the upstanding portion on the mass 15 may be inserted into the groove of the member 14 and held together by the magnetic attraction between the north and south poles of the two members. Any mechanical force in a direction perpendicular to the force of magnetic adhesion tends to move the tongue of the mass 15 into the undercut portion of the member 15 to thus effect a mechanical locking action. To release the members, it is only necessary to slide the masses 14, 15 relative to each other so that the tongue no longer is engaged in the undercut portion, and the members may then be pulled apart in the usual manner. It will be appreciated that because of the orientation of the poles, the members will slide rather easily in a transverse direction of their longitudinal length so that the tongue may be readily disengaged from the undercut portion.

It will thus be seen that embodiments of the invention have been described which accomplish all of the objectives thereof, and others, which provides an elastic mass of permanent magnetic material which will exert a holding, closing, or sealing action uniform over its entire length which is readily engaged, and yet which is readily disengaged.

It will be appreciated that electrically conductive wire could also be provided with a surrounding sheath or a portion of a sheath of flexible magnetic material whereby the wire or cable may be held in close contact with a ferro magnetic surface. The permanent magnetic materials above referred to for incorporation into the plastic mass of rubber or the like generally have a high electrical insulation and therefore their incorporation into the actual insulation for the electrical cable will not adversely affect the electrically insulating characteristics of the covering.

The invention has been described with reference to preferred embodiments. Obviously, modification and alterations differing in appearance and composition from that of the preferred embodiments will occur to others upon the reading and understanding of this specification. It is my intention to include all such modifications and alterations insofar as they come within the scope of the appended claims.

Having thus described my invention, I claim:

1. A permanent holding magnet adapted to be attracted to a magnetically attractable member consisting of a mixture of a non-magnetic flexible plastic binder and particles of a powdered permanent magnetic material, said particles having a size less than 0.3 mm. and being dispersed in spaced relationship throughout the binder with the spaces between the particles being filled with said binder, the improvement which comprises: said magnet material having a permeability on the order of and a coercivity at least as high as iron-barium-oxide magnetic materials, said magnet having at least one continuous generally flat surface and said particles as a group being permanently magnetized to present at least a pair of magnetic poles on said one surface, each of opposite magnetic polarity from the other with the axis of magnetization of said poles extending outwardly from and perpendicular to said surface.

2. The permanent magnet of claim 1 wherein said permanent magnetic materials are selected from the class consisting of iron-barium-oxide and bismuth-manganese.

3. The permanent magnet of claim 1 wherein said poles have a spacing of one millimeter and a width of three millimeters.

4. The magnet of claim 1 wherein the magnet has a thickness measured perpendicularly from said one surface of approximately 1.5 millimeters.

5. The magnet of claim 1 wherein said binder and magnetic material are combined in the approximate ratios of 40 to 60% by volume.

6. The magnet of claim 1 wherein said surface is elongated in at least one direction and said magnetic poles are elongated and extend longitudinally of said surface in spaced parallel relationship, said poles alternating in magnetic polarity transversely of the length of said surface.

7. The magnet of claim 1 wherein the surface is elongated in at least one direction and the magnetic poles are elongated and extend transversely of the length of said surface in spaced parallel relationship, said poles alternating in magnetic polarity along the length of said surface.

8. The permanent magnet of claim 1 wherein said one surface is elongated in at least one direction in combination with means for supporting the magnet in spaced relationship to a supporting member, said means including a portion adapted to be attached to a supporting member and a second portion intermediate said magnet and first portion flexible in a direction perpendicular to said one surface of said permanent magnet.

9. The permanent magnet of claim 1 wherein said magnet is in the form of a flat sheet with one surface of said sheet having at least two pairs of opposite polarity magnetic poles.

10. A closure arrangement for a pair of relatively movable members, one of said members being of material attractable to a magnet and presenting an elongated generally flat surface, the improvement which comprises: the other of said members comprising an elongated unitary permanent magnet having a generally flat surface adapted to face and be magnetically attracted to said first mentioned flat surface, said permanent magnet being comprised of a mixture of flexible plastic material and particles of permanent magnetic material having a permeability on the order of and a coercivity at least as high as iron-barium-oxide dispersed throughout said flexible material, said particles having a size less than 0.3 mm., said material being permanently magnetized to present at least a pair of magnetic poles each of opposite magnetic polarity extending continuously along said magnet surface and having an axis of magnetization perpendicular to said one magnet surface, whereby said members are attracted to each other.

11. The improvement of claim 10 wherein said other member also comprises a base and means elastically supporting said permanent magnet on said base for limited movement relative to said base.

12. The improvement of claim 11 wherein said means comprises an elongated tubular element having elastic side walls spacing said magnet from said base.

13. The improvement of claim 11 wherein said means comprises a cushioning pad of foam rubber.

14. The improvement of claim 11 wherein said means is an elongated element including a portion fastened to said base and an elastic wall spacing said magnet from said base.

15. The combination of claim 10 including the further improvement which comprises said magnetically attractable material is comprised of the same material as said elongated unitary permanent magnet and is permanently magnetized.

References Cited in the file of this patent

UNITED STATES PATENTS

| | | |
|---|---|---|
| 1,976,230 | Kato | Oct. 9, 1934 |
| 1,997,193 | Kato et al. | Apr. 9, 1935 |
| 2,192,569 | Williams | Mar. 5, 1940 |
| 2,203,580 | Ronning | June 4, 1940 |
| 2,389,298 | Ellis | Nov. 20, 1945 |
| 2,461,201 | Ellis | Feb. 8, 1949 |
| 2,547,948 | Kornei | Apr. 10, 1951 |
| 2,576,679 | Guillaud | Nov. 27, 1951 |
| 2,589,766 | Bradley | Mar. 18, 1952 |
| 2,627,097 | Ellis | Feb. 3, 1953 |
| 2,655,195 | Curtis | Oct. 13, 1953 |
| 2,659,114 | Anderson et al. | Nov. 17, 1953 |
| 2,711,901 | Von Behren | June 28, 1955 |
| 2,723,896 | Wurtz | Nov. 15, 1955 |
| 2,727,192 | Rinia et al. | Dec. 13, 1955 |
| 2,762,777 | Went et al. | Sept. 11, 1956 |
| 2,762,778 | Gorter | Sept. 11, 1956 |
| 2,794,228 | Teher | June 4, 1957 |
| 2,796,359 | Speed | June 18, 1957 |
| 2,807,841 | Janos | Oct. 1, 1957 |
| 2,812,203 | Scholten | Nov. 5, 1957 |
| 2,849,312 | Peterman | Aug. 26, 1958 |

OTHER REFERENCES

Journal of Applied Physics, November 1952, pages 1207–1211.

Philips Technical Review, vol. 13, No. 7, pages 194–208.